(12) United States Patent
Switzer

(10) Patent No.: US 10,780,512 B2
(45) Date of Patent: Sep. 22, 2020

(54) MULTI-COMPONENT GEAR CUTTING TOOL

(71) Applicant: GLEASON CUTTING TOOLS CORPORATION, Loves Park, IL (US)

(72) Inventor: Kurt E. Switzer, Durand, IL (US)

(73) Assignee: GLEASON CUTTING TOOLS CORPORATION, Loves Park, IL (US)

( * ) Notice: Subject to any disclaimer, the term of this patent is extended or adjusted under 35 U.S.C. 154(b) by 0 days.

(21) Appl. No.: 16/111,642

(22) Filed: Aug. 24, 2018

(65) Prior Publication Data

US 2020/0061727 A1    Feb. 27, 2020

(51) Int. Cl.
| | | |
|---|---|---|
| *B23F 5/16* | (2006.01) | |
| *B23F 21/04* | (2006.01) | |
| *B23F 21/10* | (2006.01) | |
| *B23F 21/06* | (2006.01) | |
| *B23F 21/12* | (2006.01) | |

(52) U.S. Cl.
CPC .......... *B23F 21/066* (2013.01); *B23F 21/128* (2013.01); *B23F 5/163* (2013.01)

(58) Field of Classification Search
CPC .......... Y10T 407/174; Y10T 29/49462; B23F 21/066; B23F 21/106; B23F 5/163; B23F 21/083; B23F 21/086; B23F 21/046; B23F 21/126; B23F 21/128; B23F 21/10; B23C 5/20; B23C 5/22; B23C 2210/02; B23C 2210/03; B23C 2240/08
See application file for complete search history.

(56) References Cited

U.S. PATENT DOCUMENTS

| | | | | |
|---|---|---|---|---|
| 579,570 | A * | 3/1897 | Fellows | B23F 21/10 407/28 |
| 1,926,646 | A * | 9/1933 | Leahy | B23F 21/10 407/28 |
| 4,465,411 | A * | 8/1984 | Boyce, Jr. | B23F 21/10 228/119 |
| 4,629,377 | A * | 12/1986 | Tlaker | B23F 21/106 407/28 |

(Continued)

FOREIGN PATENT DOCUMENTS

| | | |
|---|---|---|
| DE | 10131358 A1 | 1/2003 |
| DE | 10347755 A1 | 7/2004 |

(Continued)

OTHER PUBLICATIONS http://www.sampspa.com/blog/gear-shaping-and-shaper-cutters Gear Shaping Process and Shaper Cutters (Year: 2017).*

(Continued)

*Primary Examiner* — Sara Addisu
(74) *Attorney, Agent, or Firm* — Robert L. McDowell

(57) ABSTRACT

A multi-component gear cutting tool that is rotatable about an axis of rotation. The gear cutting tool includes a tool body extending axially lengthwise between a first end and a second end with the tool body being made of a first material. The gear cutting tool further includes a cutting tip attached to the tool body at one of the first end and the second end. The cutting tip includes an outer axial-facing cutting end with the cutting end having a plurality of cutting faces. The cutting tip is made of a second material different than the first material and the cutting tip is attached to the tool body via brazing.

11 Claims, 2 Drawing Sheets

(56) References Cited

U.S. PATENT DOCUMENTS

| | | | | |
|---|---|---|---|---|
| 4,673,317 | A | * | 6/1987 | Haug .................... B23F 21/106 407/28 |
| 5,098,231 | A | * | 3/1992 | Haug .................... B23F 21/106 407/28 |
| 9,643,282 | B2 | | 5/2017 | Kennametal |
| 2012/0207555 | A1 | * | 8/2012 | Sjoo ..................... B23F 21/166 407/114 |
| 2012/0285293 | A1 | * | 11/2012 | Mirchandani ........... C22C 29/00 75/230 |
| 2013/0071197 | A1 | * | 3/2013 | Marx ..................... B23F 5/163 409/33 |
| 2013/0243540 | A1 | * | 9/2013 | Schaffeld ............... B23F 5/163 409/12 |
| 2016/0144468 | A1 | * | 5/2016 | Nam ...................... B23P 15/32 407/118 |
| 2016/0175950 | A1 | * | 6/2016 | Stadtfeld ............... B23F 21/106 407/47 |
| 2017/0235283 | A1 | * | 8/2017 | Saito ..................... G05B 13/04 700/98 |
| 2018/0036813 | A1 | * | 2/2018 | Zimmermann ......... B23F 5/163 |
| 2019/0061030 | A1 | * | 2/2019 | Zimmermann ....... B23F 21/005 |
| 2019/0201992 | A1 | * | 7/2019 | Stadtfeld ............... B23F 21/046 |

FOREIGN PATENT DOCUMENTS

| | | | |
|---|---|---|---|
| FR | 2429069 A1 | 1/1980 | |
| JP | 61-65721 A | 4/1986 | |
| JP | 09-136208 A | 5/1997 | |
| JP | 2005-001023 A | 1/2005 | |
| JP | 2014039971 A * | 3/2014 | ............. B23F 5/163 |
| WO | 2018/002165 A1 | 1/2018 | |

OTHER PUBLICATIONS

Stadtfeld, Hermann, "Cyclocut Bevel Gear Production", Gear Solutions, vol. 9, No. 105, Dec. 2011, pp. 36-49, p. 37, paragraph 2.
Patent Abstracts of Japan, JP 09-136208, May 27, 1997, Yutaka Giken, EPO.
Patent Abstracts of Japan, JP 61-065721, Apr. 4, 1986, Mitsubishi Heavy Ind., EPO.
Patent Abstracts of Japan, JP 2005-001023, Jan. 6, 2005, Mitsubishi Materials, EPO.
International Search Report and Written Opinion for PCT/US2019/046513, dated Nov. 21, 2019, ISA/EPO, 12 pgs.

* cited by examiner

MULTI-COMPONENT GEAR CUTTING TOOL

FIELD OF THE INVENTION

The invention is directed to cutting tools and particularly to multi-component gear cutting tools for power skiving or shaping.

BACKGROUND OF THE INVENTION

Power skiving and shaping are well known processes for manufacturing internal and external teeth of spur and helical gears. In power skiving, while a gear-shaped tool meshes with the workpiece, the tool is also pushed axially in the direction of the axis of the workpiece to cut the gear while meshing. The cutting speed is generated by an inclination or "cross-axis" angle between the axis of the workpiece and the axis of the tool.

In gear shaping, a cutting tool in the form of an external gear reciprocates up and down to cut the teeth in a workpiece. Simultaneously, the tool and workpiece are rotated according to the ratio of their respective numbers of teeth (i.e. their gear ratio) which emulates the rolling of two gears in mesh.

In general, both power skiving and shaping processes primarily utilize cutting tools in the form of external gears with the front side of the tool comprising cutting edges. In some tools, the entire tool is formed from a single solid piece of material such as cemented carbide (e.g. tungsten carbide in a cobalt binder). Other tool comprise an exchangeable carbide cutting tip mechanically fastened (e.g. via a center bolt) to a carbide tool body. However, carbide material is expensive and difficult to machine and attaching a cutting tip to a tool body by bolting may not enable certain tolerance requirements to be met.

There remains a need for a more accurate, less expensive, and easier to manufacture gear cutting tool.

SUMMARY OF THE INVENTION

The present invention is directed to a gear cutting tool that is rotatable about an axis of rotation. The gear cutting tool comprises a tool body extending axially lengthwise between a first end and a second end with the tool body comprising a first material. The gear cutting tool further comprises a cutting tip attached to the tool body at one of the first end and the second end. The cutting tip comprises an outer axial-facing cutting end with the cutting end having a plurality of cutting faces. The cutting tip comprises a second material different than the first material and the cutting tip is attached to the tool body via brazing.

DETAILED DESCRIPTION OF THE PREFERRED EMBODIMENT

Figure 1:
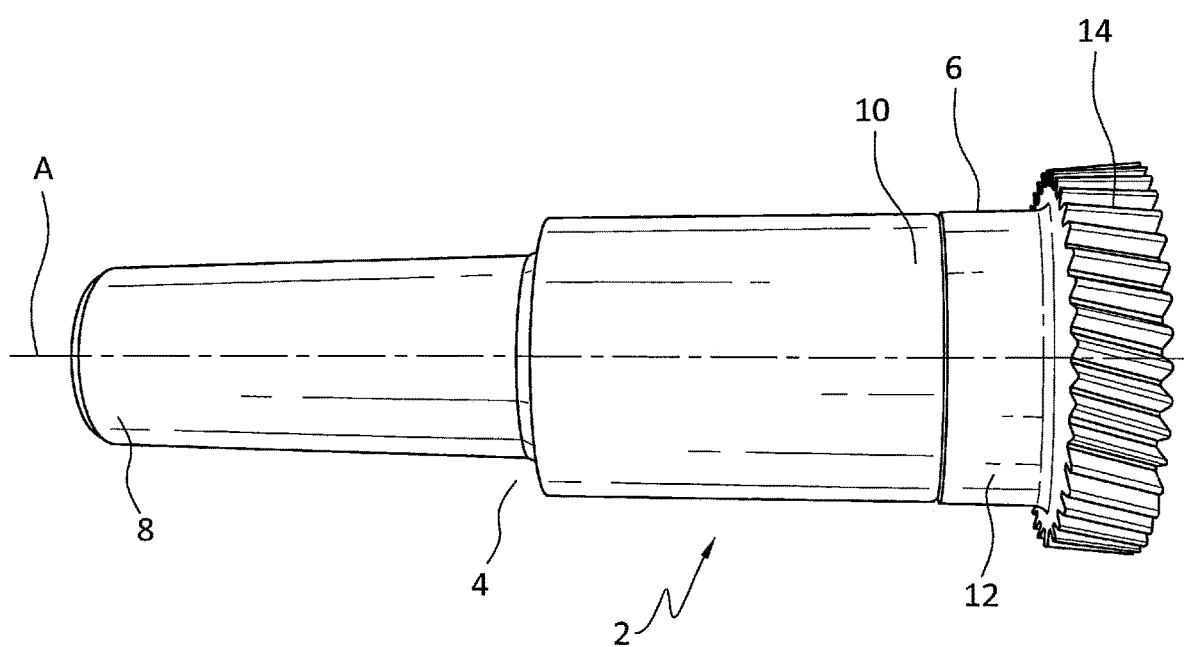
FIG. 1 illustrates a multi-component gear cutting tool according to the invention.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers.

The use of "including", "having" and "comprising" and variations thereof herein is meant to encompass the items listed thereafter and equivalents thereof as well as additional items. Although references may be made below to directions such as upper, lower, upward, downward, rearward, bottom, top, front, rear, etc., in describing the drawings, these references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance.

Figure 2:
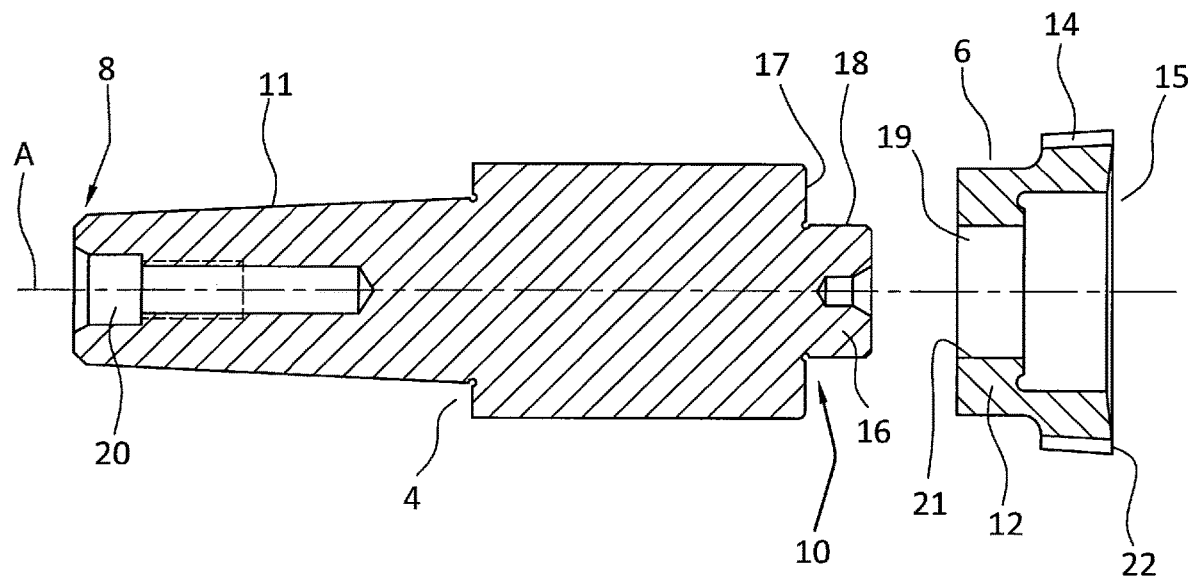
FIG. 2 is a cross-sectional view of the unassembled components of the inventive multi-component cutting tool.
Figure 3:
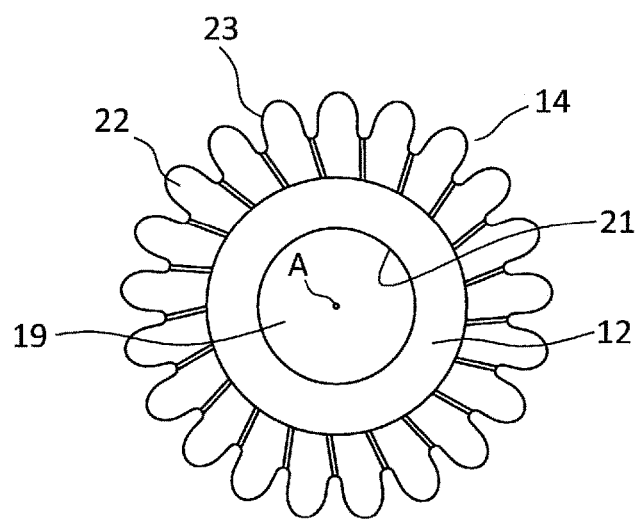
FIG. 3 is a view of the cutting end of FIG. 2.

FIG. 1-3 show a power skiving tool 2 rotatable about axis A and having a tool body 4 and a cutting tip 6. Tool body 4 comprises a first end 8 and a second end 10 with a portion 11 of the length of tool body 4 being tapered so as to fit into a complementary shaped opening of a spindle of a machine tool (not shown). First end 8 includes a suitably configured opening 20 for connection of a machine tool draw rod (not shown) for securing tool 2 in a machine tool spindle or loosening the tool 2 from the spindle as is well understood by the skilled artisan.

Second end 10 includes a projecting portion 16 preferably located and centered about axis A. The reduced diameter of the projecting portion 16, with respect to the adjacent diameter of tool body 4, defines radial surface 17 and the axial length of the projecting portion 16 defines axial surface 18.

Cutting tip 6 comprises a tip body 12 having a plurality of cutting teeth 14 located about the body 12 with each cutting tooth 14 having a cutting face 22 and a cutting edge 23 (FIG. 3). Cutting face 22 may comprise a cutting insert. Cutting teeth 14 terminate at an outer end 15. Collectively, cutting teeth 14 generally have the form of an external gear with one side of the gear being sharpened (22, 23) so that it can move through a workpiece during power skiving or shaping.

The particular arrangement and orientation of cutting teeth 14 is dependent upon factors including the type of cutting process (e.g. power skiving or shaping), the type of workpiece (e.g. spur gear, helical gear, etc.) and geometry of the workpiece being machined as can be appreciated by the skilled artisan. The particulars of the cutting teeth, per se, form no part of the invention and additional discussion thereof is not necessary for a complete understanding of the invention.

Cutting tip 6 further includes a central opening 19 sized to accommodate the insertion of projection portion 16 into opening 19. The cutting tip 6 is attached to tool body 4 by brazing, preferably brazing applied between axial surface 18 of the projection portion 16 and the inner axial surface 21 of opening 19. Preferably the brazing material is of a suitable type to withstand the heat and/or vacuum conditions encountered in the application of wear coatings to the cutting teeth 14 and parts thereof, namely the cutting faces 22 and edges 23. Appropriate braze materials are commercially available and may be characterized by the absence of zinc, cadmium or tin which enhances resistance to degradation in high heat and vacuum conditions. An example of a suitable braze material is PREMABARZE 616 a silver-copper-indium composition commercially available from Lucas-Milhaupt Inc.

When a cutting tip becomes worn and can no longer be sharpened, the cutting tip may be removed by heating to melt the braze material. Another cutting tip may be brazed to the tool body 4.

With respect to application of wear coatings, an example of one such coating application process is physical vapor deposition (PVD). A preferred wear coating for the cutting teeth comprises aluminum-chromium-nitride (AlCrN) but any suitable wear coating may be utilized such as nitride or carbide compositions with metallic components such as titanium, aluminum, chromium, vanadium, silicon, etc.

While power skiving and shaping tools of a singular unitary construction and material are well known, the cutting tools of the invention enable different materials to be used for the tool body 4 and the cutting tip 6. For example, the tool body 4 may be produced from steel or other iron-based alloys, particularly precipitation hardened alloys such as, for example, MC90 Internet by Böhler. Many steels and iron-based alloys can be easily machined in the soft condition followed by heat treating to harden and then finish grinding if necessary.

Cutting tip 6 is preferably made from carbide materials such as cemented carbide (e.g. tungsten carbide in a cobalt binder, WC-CO). Cutting tip 6 may also include cutting inserts of either carbide material or polycrystalline diamond (PCD).

With the multi-component (e.g. two-part) cutting tool of the invention, the overall amount of carbide material is reduced given that the tool body 4 is made from another material. As a result, the cost of the tool is less compared to a tool made entirely of carbide.

Importantly, the attachment of the cutting tip 6 to the tool body 4 via brazing provides for a more accurate assembly of the components compared to mechanically fastening the tool body and cutting tip together such as by one or more bolts or other mechanical means. With mechanical fastening, the cutting tip must be removed from a tool body in order to reapply a wear coating after re-sharpening. This is because with a mechanically assembled tool, contaminants can enter into the interfaces between components such as, for example, between the tool body 4 and cutting tip 6 or between a bolt and a cutting tip. In order to successfully recoat a cutting tool, the tool must thoroughly washed so as to be contaminant-free. However, contaminants that exist in the tool interfaces cannot be completely washed away and, therefore, a mechanically-assembled tool must be disassembled in order to adequately wash the necessary components so they will be contaminant-free prior to recoating. With the disassembly and reassembly, the precise cutter tolerances that existed in the originally manufactured tool are difficult, if not impossible, to repeat and maintain.

However, with the cutting tool components, such as the tool body 4 and the cutting tip 6, attached to one another by brazing as in the present invention, the braze material fills and seals the interface between the tool body 4 and the cutting tip 6. Therefore, contaminants cannot enter the interfaces and hence, there is no need to disassemble the inventive multi-component tool prior to washing and recoating.

Although the invention has been discussed and illustrated with one projecting portion 16 and one opening 19, the invention is not limited thereto. A plurality of projecting portions may be included at the first or second ends (8, 10) of tool body 4 and a corresponding number of openings 19 included in cutting tip 6 with the plurality of projecting portions and openings being appropriately sized and positioned so as to line-up and insert when assembling the cutting tool.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A gear cutting tool comprising a gear power skiving cutter or a gear shaping cutter, said gear cutting tool being rotatable about an axis of rotation and comprising:
   a tool body extending axially lengthwise between a first end and a second end, said tool body comprising a first material,
   a cutting tip attached to said tool body at said second end, said cutting tip having an outer axial-facing cutting end with said cutting end comprising a plurality of cutting faces, said cutting tip comprising a second material different than said first material,
   said cutting tip being attached to said tool body via brazing.

2. The gear cutting tool of claim 1 wherein said tool body comprises an iron based alloy.

3. The gear cutting tool of claim 2 wherein said tool body comprises a precipitation hardened iron based alloy.

4. The gear cutting tool of claim 2 wherein said tool body comprises steel.

5. The gear cutting tool of claim 1 wherein said cutting tip comprises carbide.

6. The gear cutting tool of claim 5 wherein said cutting tip comprises cemented carbide.

7. The gear cutting tool of claim 1 wherein said cutting tip comprises cutting inserts.

8. The gear cutting tool of claim 7 wherein said cutting inserts comprise polycrystalline diamond.

9. The gear cutting tool of claim 1 wherein said plurality of cutting faces includes a wear coating.

10. The gear cutting tool of claim 9 wherein said wear coating comprises a physical vapor deposition coating.

11. The gear cutting tool of claim 1 wherein said tool body comprises at least one axially projecting portion at said second end, and wherein said cutting tip comprises at least one opening positioned to accommodate insertion of said at least one axially projecting portion, said at least one axially projecting portion extending into said opening.

* * * * *